DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 394

T913,011

CALCIUM ADDITION TO THORIUM OXIDE

Richard W. Pensak, Pittsburgh, Pa., assignor to the United States of America as represented by the U.S. Atomic Energy Commission

Filed Mar. 16, 1973, Ser. No. 342,130
Int. Cl. C01f *15/00*
U.S. Cl. 252—301.1 R
No Drawing. 2 Pages Specification

This invention relates to a novel process for attaining a well defined and uniform microstructure and a high sintered density for thorium oxide fuel components. These highly desirable features are achieved by the addition of about 50 to 150 parts per million of calcium to thorium oxide powder. Blending is carried out either by mechanically adding calcium to thorium oxide powder or by adding calcium nitrate or other calcium salt in the correctly calculated amount to the thorium oxide production facility. Fuel components prepared from thorium oxide containing this small amount of calcium are particularly suitable in breeder type reactors.